April 10, 1951 H. S. JOHNS ET AL 2,548,111
CONVEYER DISCHARGE MECHANISM
Filed Aug. 8, 1944 4 Sheets-Sheet 1

Patented Apr. 10, 1951

2,548,111

UNITED STATES PATENT OFFICE 2,548,111

CONVEYER DISCHARGE MECHANISM

Henry S. Johns, Cleveland Heights, Ohio, and William H. Johns, Joliet, and Alfred D. Sinden, Aurora, Ill., assignors, by direct and mesne assignments, to Stephens-Adamson Mfg. Co., a corporation of Illinois Application August 8, 1944, Serial No. 548,546

28 Claims. (Cl. 198—65)

1

This invention relates to conveying apparatus of the type which comprises an endless tubular conveyor belt, successive parts of the tubular portion whereof are adapted to be continuously opened as these parts are brought below a loading station and above an unloading station by the movement of the belt and which successive parts are adapted to be continuously closed after having been moved beyond said stations.

The general purpose and object of this invention is to provide a cooperating construction of tubular conveyor belt of the foregoing type with special devices for discharging the contents thereof at any selected place of delivery. A still further object is to improve the belt in certain structural features thereof.

We accomplish the foregoing general objects, as well as other and more limited objects, in and through the construction and arrangements of parts shown in the drawings hereof, wherein Fig. 1ª a detail in section taken on the line 1ª—1ª of Fig. 1.

2

Describing by reference characters the general features of construction of the apparatus shown in Figs. 1–4 inclusive, 10 denotes pairs of opposed vertical members and 11 and 12 pairs of opposed horizontal members which constitute opposite sides of a part of the support for the conveyor belt and its driving and operating mechanism, the support embodying the aforesaid members constituting a rectangular frame. The upper horizontal members 12 are extended beyond the vertical members 10 and are connected with vertical end posts 13.

14 denotes pairs of opposed upper members, between which the conveyor belt is conducted, and 15, 16 and 15ª pairs of opposed supporting members between which the conveyor belt is conducted in passing from its lower load-receiving position to its upper load-discharging position. 17 denotes the shafts of rollers which are journaled in bearings in brackets 17ª located below the lower stretch of the belt as well as in bearings in brackets which are carried by the upper ends of the side members 15 and the upper and lower ends of the side members 15ª, the said shafts also having their ends journaled in bearings carried by the opposed upper members 14. 18 denotes the shafts of rollers which engage the flanges at the base of the conveyor belt and which serve to retain the latter in proper position between the side members 14, 15, 15ª and 16. The rollers of the type mounted on the shafts 17 and 18 are shown more particularly in Figs. 3 and 4 at 19 and 20, respectively.

Figures 1, 1A, 9, 11, 14:
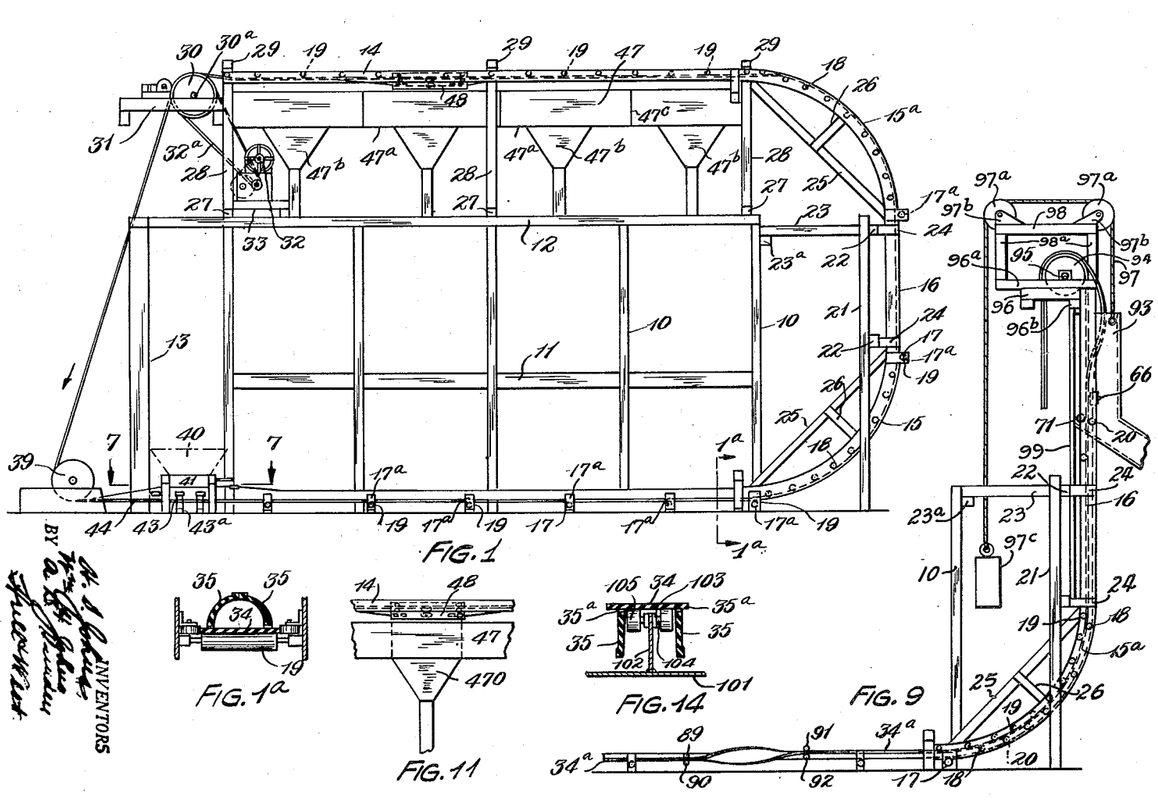
Fig. 1 represents a somewhat diagrammatic side elevational view of a conveying apparatus constructed in accordance with our invention.
Fig. 9 a somewhat diagrammatic view in elevation showing a modification of a part of the apparatus illustrated in Fig. 1.
Fig. 11 a detail in elevation of a modification of the movable load-delivering device shown in Figs. 1 and 2.
Fig. 14 a detail in section showing a modification of the means for supporting open portions of the belt.

As indicated in Fig. 1, the side members 16 between which the conveyor belt travels in passing from its lower load-receiving position to its upper load-discharging position are supported in part by opposed vertical posts 21 to which are secured transverse bracing members 22 and an upper horizontal bracing member 23 having its outer ends secured to the upper bracing member 22 and its inner end supported by a sill 23ª secured to the adjacent members 10. 24 denotes brackets secured to the bracing members 22 and to opposite sides of the side members 16. The upper and lower curved portions 15 and 15ª are supported each by a truss construction comprising a beam 25 and central struts 26 connected to opposite sides of said beam. In comparatively small installations, some of the parts which have just been recited as being employed for supporting the conveyor belt may be omitted.

The members 14 between which the upper stretch of the conveyor belt travels are shown as supported from the upper members 12 of the framework first described, by means of transverse sills 27 and pairs of opposed vertical posts 28 extending upwardly therefrom and having their ends in turn connected by transverse sills 29.

30 denotes a pulley for driving the conveyor belt, the shaft 30$^a$ of said pulley being journaled in bearings (not shown) supported on a framework 31 extending outwardly from the posts 28 at the end of the apparatus opposite that which supports the side members 15, 16 and 15$^a$. This pulley is shown as driven by an electric motor 32 mounted on a platform 33.

The conveyor belt shown herein is substantially identical with that shown, described and claimed in the application of Henry S. Johns and William H. Johns, filed April 18, 1942, Serial No. 439,502, Patent No. 2,365,762 and comprises a wide flat planar base 34 and sides 35 hinged to the said base, the base and sides being composed of flexible material, preferably having the elastic characteristics of rubber. The sides are hingedly secured to the base within the lateral edges of the latter, as indicated at 35$^a$, whereby flanges 34$^a$ are provided beyond the said sides, the side flanges being adapted to be engaged by the rollers 20, which serve to guide the conveyor belt when the latter is traveling in a substantially vertical position and to guide and support the belt when the latter is traveling in a horizontal position with its sides extending downwardly from the base and also when the belt is following a curved path. The outer ends of the sides are thickened to provide shoulders 36, the said shoulders being provided with teeth or projections 37 and with intermediate recesses 38, each tooth or projection having an enlarged outer end connected to its shoulder by means of a narrow or neck portion and the recesses between the teeth being complementary in shape to the teeth or projections and the teeth or projections on one shoulder being arranged in such manner as to enable the same to be interlocked with the recesses provided between the teeth on the opposed shoulder—all as shown and described in the aforesaid application of Henry S. and William H. Johns.

39 denotes a roller which is mounted at the bottom of the apparatus shown in Fig. 1 and at the end of the same which is opposed to the side members 15, 16 and 15$^a$. In practice this roller will be adjustable for the purpose of taking up the slack of the belt, whenever necessary to do so, and the conveyor belt passes around the said roller in a flattened condition, the lower surface of the roller being preferably in the same plane as the tops of the rollers 19 which support the base of the conveyor as the latter is moved below the loading hopper 40 and which are conveniently supported by the brackets 17$^a$. The members 15, 16 and 15$^a$ are provided with similar brackets at the places designated by the numeral 17$^a$, whereby the rollers supported by said brackets will engage the base of the conveyor belt during its travel. Between the bottom and the top of each pair of opposed members 15 and 15$^a$, the flanges of the belt are engaged by rollers 20, the shafts of which are indicated at 18.

Figure 7:
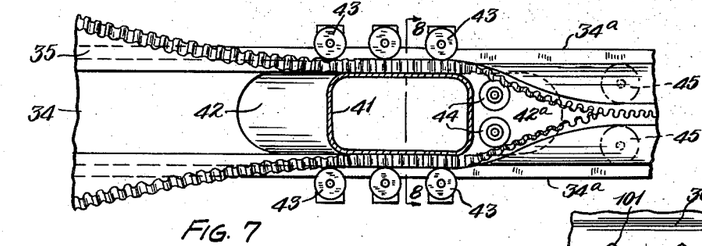
Fig. 7 an enlarged sectional view taken on the line 7—7 of Fig. 1.
Figure 8:
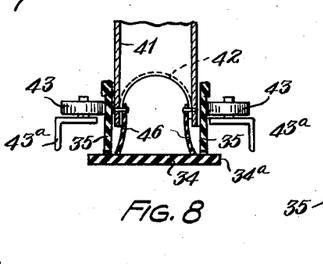
Fig. 8 a detail in section taken on the line 8—8 of Fig. 7.

Assuming the conveyor belt to be traveling in the direction of the arrows, before reaching the loading station, indicated generally at 40, the sides of the conveyor belt are lifted from the base, as by means of the portion 42 of a saddle which may be formed integral with the bottom of the chute 41, the portion 42 projecting toward the roller 39 while another portion 42$^a$ extends in the opposite direction from the opposite end of the chute (see Figs. 7 and 8). These saddles are so located as to enable the upper edges of the sides of the belt to pass thereover and to contact with the sides of the chute. The rollers 43, supported by brackets 43$^a$, assist in holding the sides of the belt in engagement with the saddle and with the sides of the chute 41. Rollers 44 mounted on the portion 42$^a$ of the saddle may be employed to prevent the portion of the belt leaving the chute from dragging against the corners of the latter; and rollers 45 will be employed for locking together successive portions of the edges of the belt as the belt leaves the portion 42$^a$ of the saddle. The employment of the rollers 44 and 45 is shown, described and claimed in the aforesaid application of Henry S. and William H. Johns, and needs no further description herein.

In order to prevent any fine material which may be discharged through the chute from passing around the sides of the chute and the edges of the saddle and thence through the opening in the belt thereabove, we have secured a curtain 46 of flexible material, such as rubber, to the lower edge of the periphery of the saddle and to the sides of the chute to which the saddle is attached, the curtain being of sufficient depth to extend to the base of the conveyor when no load is being discharged through the chute but which will be spread into contact with the sides of the belt by such material, thereby to prevent fine material from passing upwardly around the sides of the chute and the edges of the saddle and thence through the opening in the belt thereabove.

47, 47$^b$ denote discharge chutes depending from the bottom 47$^a$ of bins formed between the said bottoms and side members 47, the bins being separated by transverse partitions 47$^c$. The conveyor belt passes in inverted position above these bins after having received its load from the hopper 40.

For the purpose of discharging the contents of the conveyor belt at any selected place of delivery, we have provided the following construction, referring more particularly to Figs. 1, 2, 3 and 4.

The members 14 are shown in the form of structural channels having secured to the bottoms thereof Z-bars 14$^a$ the lower horizontal flanges 14$^b$ of the bars on the opposed channels 14 being projected toward each other. These flanges provide rails for supporting rollers mounted on a carriage partly through and partly above which the conveyor belt is caused to travel. The carriage comprises a housing having sides 48 and ends 49; and these ends in turn are provided each with a channel through which the lower portion of the conveyor belt may pass, this channel being preferably provided between the sides of the carriage and by the recesses provided in the ends of the carriage. The recesses are formed between convergent opposed edges 49$^a$ of each end and between substantially parallel side edges 49$^b$, the bottom of each recess being shown at 49$^c$.

50 denotes rollers, the shafts 51 whereof are journaled in bearings in the sides of the housing, the rollers being adapted to engage and be supported upon the flanges 14$^b$. In the embodiment of the invention shown in Figs. 1–4, inclusive, each side 48 supports three such shafts and rollers, the middle rollers being equi-distantly spaced from the end rollers.

The channel members 14 also support the shafts 18 for the rollers 20, the said shafts extending above the carriage housing and the rollers engaging the external flanges 34ª of the base of the conveyor belt. The channel members 14 also support shafts 17 for the rollers 19 which engage the base of the belt to prevent vertical oscillation of the same while traveling between the said members.

With the parts constructed and arranged as thus far described, the operation will be as follows, the starting point, for purposes of description, being assumed as that at which the conveyor belt has received its load from the hopper 40, it being noted that, for convenience of description, the direction in which the conveyor is being driven after having received its load will be referred to hereinafter as the "forward" direction, and the terms "forward" and "rearward" and "front" and "rear" will be applied in like manner to the parts of the apparatus which are traversed by the belt. Passing from the said hopper, the outer edges of the sides of the belt which have received therebetween the load from the hopper will be interlocked by the rollers 45. This portion of the belt will then travel in a horizontal direction, being supported on its base by the rollers 19 and, as it passes between the side members 15, 16 and 15ª, the flanges will be supported and guided by the rollers 20; it then passes between the side members 14 and through the carriage, which is supported from these side members above any one of the bins into which the load is to be deposited. As it passes through the carriage, the belt will be supported by the rollers 20 engaging its flanges, the shafts 18 of which rollers extend above the carriage housing. When this portion of the belt reaches the discharging zone within the carriage, the outer edges of its sides will be separated by anti-friction separators acting upon the inside walls of the belt, thereby to spread the interlocked teeth apart quickly, the said separators being shown as rollers 52, the shafts of which rollers are supported upon a bracket 53 extending across the carriage and connected to the opposite sides of the housing thereof, it being noted that the belt is held against premature opening by means of the rollers 54, which engage the shoulders 36, said rollers being located at the end of the carriage which the belt enters, and that the shouldered edges of the belt are thereafter interlocked by means of like rollers 54 located at the outgoing end of the carriage. The shafts of the rollers 54 are supported by brackets 54ª secured to opposite sides of the housing.

In addition to the rollers 52, the carriage is provided with spreading rollers 55, located forwardly of the rear rollers 52 and the shafts whereof are supported by brackets 56 attached to the sides of the carriage housing and which rollers not only spread the sides of the belt apart sufficiently to enable the discharge of the full load without material obstruction by the sides of the belt but also without any obstruction of such discharge by the rollers themselves In addition, we provide rollers 57 which engage the outer sides of the belt to prevent scuffing of the same against the carrying rollers 20 when the sides are spread apart by the rollers 55. The shafts of the rollers 57 are supported by brackets 58 which extend outwardly above the sides of the carriage housing and are secured to the side members 15.

From the foregoing, it will be seen that, as the belt passes through and above the carriage, the successive portions of the same have the edges of their sides held in interlocked position by the first set of rollers 54, then opened by the rollers 52, spread apart by the rollers 55, and closed by the second set of rollers 54.

The second set of closing rollers 54 is employed where the material carried by the belt is of a dusty nature or contains a quantity of dust, some of which dust might adhere to the sides of the belt and be dislodged therefrom as the portions of the belt which have been discharged pass beyond the load-receiving hopper. However, whether these rollers are or are not employed, the belt will be passed in an open condition around the roller 30. This can be accomplished by merely placing the inner surfaces of the sides of the belt, when the latter is installed, in contact with the roller 30 which in practice will have its central portion elevated to engage and support the base of the belt. When the second set of closing rollers 54 is employed, additional closing rollers may be used, but in such case will be located a sufficient distance from the right side of the roller 30 to enable the sides of the successive portions of the belt to be spread apart by the roller 30 and the inner surfaces of its sides and base to be brought into contact with said roller.

It will be obvious that, by connecting a hopper directly to the bottom of the carriage, and by eliminating the bottoms of the bins and the partitions therebetween, the hopper may be moved, together with the carriage, to any desired locatitions therebetween, the hopper may be moved, Such a connection is indicated in Fig. 11, wherein the hopper 470 is shown as extending between the side members 47, with its upper end connected to the bottom of the carriage sides 48.

Figure 5:
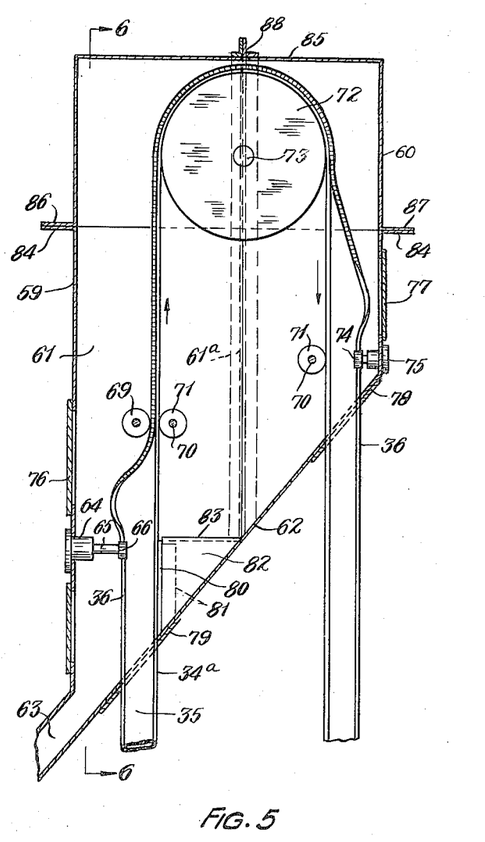
Fig. 5 a detail in sectional elevation showing our conveyor belt employed in connection with devices for opening and discharging the contents thereof while the belt is traveling in a vertical direction, the view being taken on the line 5—5 of Fig. 6.
Figure 6:
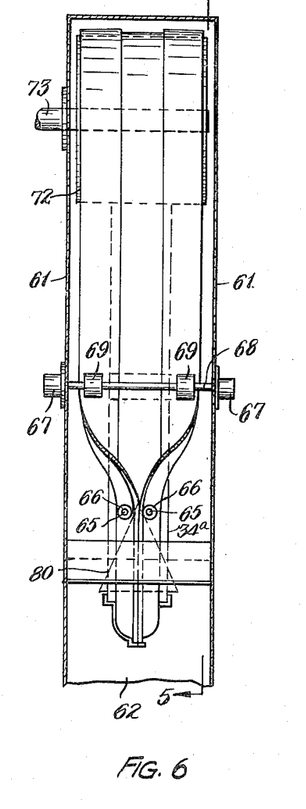
Fig. 6 a detail in elevation corresponding to and taken on the line 6—6 of Fig. 5.

In Figs. 5 and 6, there is shown a combination hopper and carriage which is particularly designed to enable the contents of the belt to be discharged at any desired point while the belt is traveling in a vertical direction. In these views, what we herein designate as the front wall, the rear wall, and the side walls are identified, respectively, by the numerals 59, 60 and 61, while 62 indicates the inclined bottom wall of the combined carriage and hopper, the bottom wall being extended beyond the wall 59 to provide, with an extension of the latter wall and with the side walls, a downwardly inclined delivery chute 63.

Figure 2:
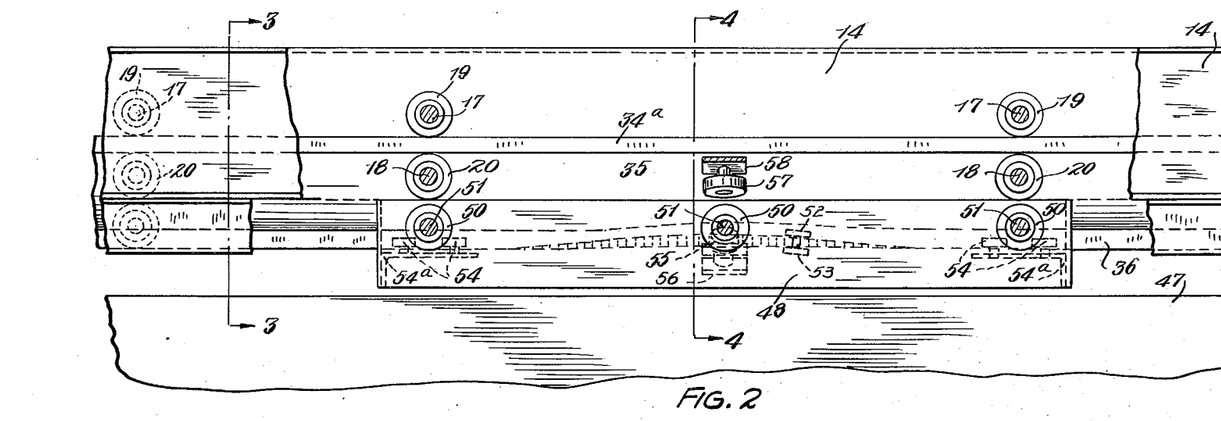
Fig. 2 a detail in side elevation, with parts broken away, illustrating a portion of the foregoing apparatus, together with the movable device for effecting the delivery of the contents of the belt when the latter is traveling in a horizontal direction.
Figure 3:
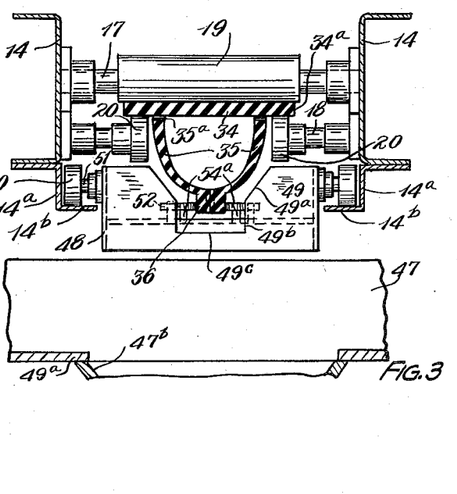
Figs. 3 and 4 are details in section corresponding respectively to the line 3—3 and 4—4 of Fig. 2.
Figure 4:
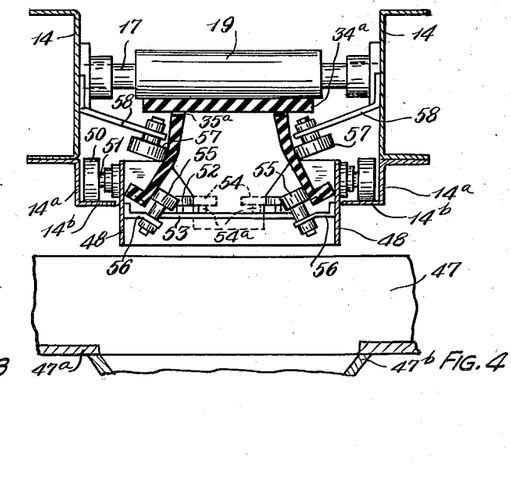

64 denotes the bearings for the shaft 65 of the holding rollers 66, the said bearings being mounted in the wall 59 and the holding rollers engaging the shoulders 36 at the side edges of the belt. 67 denotes bearings carried by the side walls 61, said bearings supporting a shaft 68 carrying the opening rollers 69. 70 denotes the shafts of rollers 71 which support the base of the belt, the shafts being journaled in bearings (in line with the bearings 67) supported by the side walls 61 of the casing. 72 denotes a drive roller supported on the shaft 73 and around which the belt passes in its open position, the contents of the belt being discharged downwardly through the chute 63. The shaft 73 may be supported in any manner, as by journals mounted on a platform such as shown at the top of Fig. 2. 74 denotes closing and holding rollers which are adapted to engage the shoulders 36, the shafts of the holding rollers being mounted in bearings 75 carried by the rear wall of the housing 60. These closing rollers are conveniently located in close proximity to the rollers 71 which support the base after the belt has passed the roller 72. The front and rear walls of the housing are provided with doors 76 and 77 which are so located as to give convenient access to the portions of the belt which are subjected to the action of the opening and closing rollers. This enables us to open the belt by hand and to position the rollers 69 therein and also to close it by hand to enable the rollers 71 to engage the shoulders thereon when the belt is first installed in the combined hopper and carriage. After this preliminary setting of the parts, the rollers will operate thereafter to effect the opening and closing of the successive portions of the belt through the movement of the latter.

Where the material that is conveyed by the belt is of a dusty nature or contains a considerable quantity of dust, we provide means for sealing the carriage housing against the escape of such dust. The sealing means for the portions of the belt which enter and leave the combined carriage and hopper are indicated somewhat diagrammatically at 78 and 79. In order to facilitate the delivery of material discharged from the belt into the chute and without contacting the same with the successive portions of the belt which are entering the bottom of the combined hopper and carriage, we have provided the bottom wall 62 with a saddle comprising a bracket having a vertical base 80 the bottom of which bracket is of greater width than the width of the base of the belt and which engages the base of the belt. This bracket includes triangular upwardly extending guides 81, forming an inverted V, and on these guides are mounted the front ends of the side walls of an inverted V-shaped saddle 82, the said saddle being preferably of sheet metal and having the sides thereof meeting at an edge 83 which is horizontal when the inclined bottom edges of the sides are seated upon the inclined bottom wall 62 of the hopper. This saddle serves to spread any material discharged thereonto from the belt and to keep the same out of contact with the successive portions of the belt which are passing through the bottom wall 62.

As indicated herein, the carriage housing may be made in two sections, the side walls 61 of which are provided with vertically extending angle bars 61ª whereby the sections may be conveniently connected and/or disconnected.

To prevent the discharge of dust into the space wherein the belt may be operated, we provide the top of the housing with a peripheral flange 84 to which a cover extension 85 may be detachably secured by means of a peripheral flange 86 on the bottom thereof. This cover extension may also be made in two sections which are united by means of angle irons 88 at the meeting edges thereof; and, where located below the roller 72, it will be provided with sealed openings for the passage of the belt therethrough.

Figure 10:
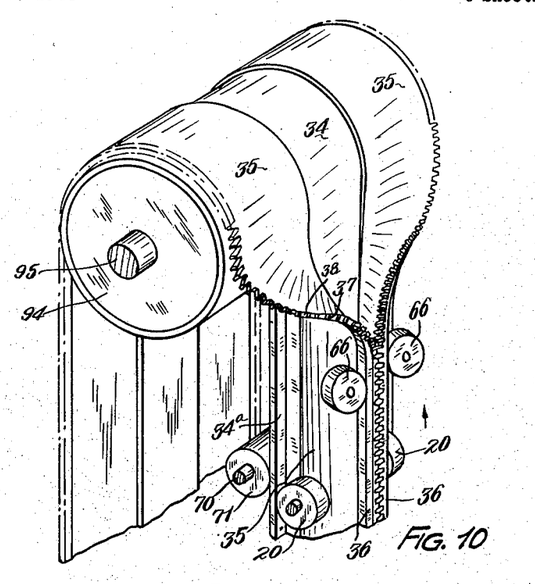
Fig. 10 an enlarged detail in perspective of the upper portion of the apparatus shown in Fig. 9, the combined hopper and carriage being omitted.

In Fig. 9 there is shown a somewhat diagrammatic elevational view, and in Fig. 10 a view in perspective, of a modification of the combined movable hopper and carriage for effecting delivery of the contents of the belt while the latter is traveling in a vertical direction. In the apparatus shown in these views, we contemplate the use of a part of the general framework shown in Fig. 1, including members corresponding to the members 10, 15ª, 21, 22, 23, 23ª, 24, 25 and 26 of Fig. 1. It will be seen from Fig. 9 that the lower stretch of the belt is given a half turn, this result being accomplished by imparting a turn or twist of 180° between the rear rollers 89, 90, which engage the tops and bottoms of the base flanges 34ª and the forward rollers 91 and 92 which engage the bottoms and tops of the said flanges. The belt is conducted between the outwardly curved side members 15, with its bottom supported by rollers 19, the shafts of which are indicated at 17 and the side flanges supported by rollers 20, the shafts of which are indicated at 18, the sides of the belt being under tension. It then passes upwardly between the vertical members 16 and through the bottom of a combined hopper and carriage, indicated generally at 93, which is provided with a base supporting roller 71, holding rollers 66 and flange-engaging rollers 20, similar to the like-designated rollers in Figs. 5 and 6. The belt, after leaving the combined hopper and carriage 93, passes over the drive roller 94. Owing to the proximity of the combined hopper and carriage to the drive roller 94, special opening rollers need not be employed, as the drive roller will serve to spread the sides of the belt apart, as shown in Fig. 10. The shaft 95 of the roller 94 may be conveniently mounted on bearings supported by a plate 96ª which is supported in turn by a platform 96, and the belt, after having passed around the roller, may be given a half turn and then be driven beneath a roller located similarly to the roller 39 in Fig. 1 and thence beneath a hopper located similarly to the hopper 40; or it may be driven, without having such a half turn imparted thereto, to and beneath the delivery chute of a loading station and there be supplied with material to be transported, after which it may be driven around a roller with its back against the latter and thence to the combined carriage and hopper 93—without the necessity for imparting a half-turn thereto after the loading operation. The bottom of the hopper 93 will be provided with sealing means similar to the sealing means 79 on Fig. 5, and it may also be vertically adjusted in the same manner as the hopper shown in Figs. 5 and 6.

Figure 12:
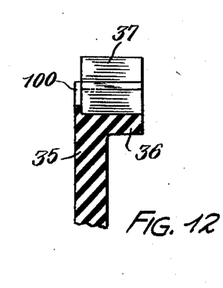
Fig. 12 a detail in sectional elevation of one of the side edges of the belt.
Figure 13:
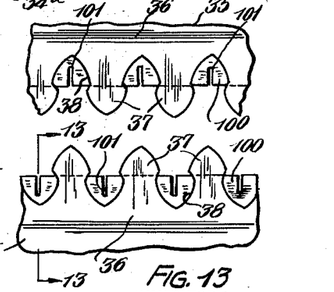
Fig. 13 a detail in elevation of the interlocking edges of the sides of the belt.

It will be evident that, by raising and lowering the combined hopper and carriage, the contents of the belt may be delivered at any desired point along its vertical stretch. The combined hopper and carriage may be supported in any convenient manner, as by means of cables 97 attached to opposite sides thereof; pulleys 97ª over which said cables extend, the said pulleys being journaled in bearings 97ᵇ supported on the opposed upper members 98 of frames, the vertical members 98ª of which are supported at their lower ends by the plate 96ª. The opposite ends of the cables are attached to counterweights 97ᶜ and the combined hopper and carriage is guided in its vertical movements by means of opposed guide mmebers 99 engaging the rear wall thereof and supported between transverse supports 96ᵇ for the platform 96 and the lower bracket 24.

Where our conveyor belt is subjected to tension when passing between the members 15 and 15ª and where the edges are provided with sealing flaps, such as shown and described in the aforesaid application of Henry S. and William H. Johns, cracks are liable to be formed in these sealing flaps, the said cracks extending inwardly from the outer edges thereof. In order to overcome this disadvantage, we provide the construction shown more particularly in Figs. 12 and 13, the former view showing a sectional elevation of the outer portion of one of the sides of our conveyor provided with a sealing flap 100, preferably integral with the interior portion of the side. As will be seen by reference to Fig. 13, we have provided these sealing flaps with narrow slots extending inwardly from the outer edges thereof, as shown at 101, the narrow slots being located intermediate of the recesses formed between the teeth of the side to which each flap is attached. By constructing the flaps in this manner, they will not only be preserved against the development of disintegrating cracks, but will also function effectively to provide a seal against the escape of liquid or semi-liquid material from the belt.

In Fig. 14 there is shown a modification of the means for supporting our conveyor belt when the same is traveling in a substantially horizontal direction with its sides open. In this view, 101 denotes a supporting base for a plurality of vertically extending brackets 102 the upper ends of which are provided with bearings 103 for shafts 104 which support rollers 105 engaging the interior of the base of the belt adjacent to the depending sides thereof.

Having thus described our invention, what we claim is:

1. In a conveying apparatus comprising a continuous movable tubular conveyor belt having the edges of its opposed sides provided with interlocking means, an unloading device and means for moving successive charged interlocking portions of the said belt therethrough, separators supported by the said device adjacent the longitudinal axis thereof and arranged to engage the inner surfaces of successive portions of the sides of the said belt thereby to disengage the interlocked edges of the said sides and separators also carried by the said unloading device and located forwardly of the former separators and within the sides of the said belt and spaced farther apart laterally than the former separators thereby to spread the outer edges of the sides apart a distance to permit material to be discharged freely from between the said sides.

2. In the conveying apparatus set forth in claim 1, the separators being rollers.

3. In a conveying apparatus comprising a continuous movable tubular conveyor belt having a base and sides and wherein the base extends beyond the sides thereby to provide supporting flanges for the said belt and wherein the outer edges of the sides are provided with interlocking means, side members and means for driving successive charged interlocked portions of the belt between said members, rollers carried by the said side members and engaging the flanges of the belt, an unloading device comprising a carriage interposed between and supported by said side members and through which carriage the belt is driven, rollers carried by said carrage and engaging the flanges of the belt, and laterally spaced separators carried by the said carriage and arranged to engage the inner surfaces of the sides of the successive portions of the belt which pass through the carriage, thereby to disengage the interlocked edges of the sides of the belt.

4. In a conveying apparatus comprising a continuous movable tubular conveyor belt having a base and sides and wherein the base extends beyond the sides thereby to provide supporting flanges for the said belt and wherein the outer edges of the sides are provided with interlocking means, side members and means for driving successive charged interlocked portions of the belt between said members with the sides of the belt directed downwardly, rollers carried by the said side members and engaging beneath the flanges of the belt, an unloading device comprising a carriage interposed between and supported by said side members and through which carriage the belt is driven, laterally spaced separators carried by the said carriage and arranged to engage the inner surfaces of the sides of the successive portions of the belt which pass through the carriage, thereby to disengage the interlocked edges of the belt, additional laterally spaced separators carried by the carriage and located beyond the first mentioned separators and serving to spread the outer edges of the sides of the belt apart a sufficient distance to permit the load to drop freely therebetween.

5. In the apparatus set forth in claim 3, the separators being rollers.

6. In the apparatus set forth in claim 3, the means for supporting the carriage from the side members comprising rollers and rails on which the rollers are mounted.

7. In the apparatus set forth in claim 4, the separators being rollers.

8. In the apparatus set forth in claim 4, brackets secured to the side members and extending above the top of the carriage, and rollers carried by the said brackets and adapted to engage the outer surfaces of the sides of the belt thereby to prevent them from engaging the first mentioned rollers.

9. In a conveying apparatus comprising a continuous movable tubular conveyor belt having the edges of its opposed sides provided with interlocking means, an unloading device, means for moving successive charged interlocked portions of said belt in registration with the said unloading device, the unloading device comprising a housing having a discharge chute extending therefrom, means for retaining the belt in a given plane for movement therealong, rollers carried by the said housing above the said chute and engaging the outer edges of the sides of the belt, thereby to hold the same interlocked, and a roller located beyond the first mentioned rollers and over and against which the belt is conducted in an open condition.

10. In the conveying apparatus set forth in claim 9, laterally spaced opening rollers supported by and within the housing and located within and adapted to engage the inner surfaces of the sides thereby to separate the same, the said opening rollers being located between the first mentioned rollers and the second roller.

11. In a conveying apparatus comprising a continuous movable tubular conveyor belt having a base and opposed sides and wherein the edges of the opposed sides are provided with interlocking means, a combined unloading carriage and hopper comprising a housing having a bottom and a discharge chute, the said bottom being provided with an opening therein and means for driving successive charged interlocked portions of the belt through the said opening, rollers carried by the housing and engaging the outer edges of the sides thereof, a roller located beyond the last mentioned rollers and over and against which the belt is conducted in open condition, and laterally spaced opening rollers supported by the housing between the last mentioned roller and the rollers which engage the outer edges of the sides of the belt.

12. In a conveying apparatus comprising a continuous movable tubular conveyor belt having the edges of its opposed sides provided with interlocking means, an unloading device comprising a housing having a bottom and a delivery chute, the said housing having an opening in the bottom thereof and means for moving successive charged interlocked portions of said belt through said opening, rollers carried by the said housing above said opening for engaging the outer edges of the sides of the belt, a roller above the said rollers and over and against which the belt is driven in an open condition, a second opening in the bottom of the housing for the passage of the said belt, closing rollers carried by the said housing and adapted to engage the outer edges of the sides of the belt prior to the passage of the latter through the last mentioned opening, and means for driving said belt.

13. In the conveying apparatus set forth in claim 12, means for effecting a seal around the portions of the belt which pass through said openings.

14. In the conveying apparatus set forth in claim 12, the housing forming a closure for the rollers, and means for effecting a seal around the portions of the belt which pass through said openings.

15. In a conveying apparatus comprising a continuous movable tubular conveyor belt having a base and opposed sides and wherein the edges of the opposed sides are provided with interlocking means, an unloading device comprising a housing having a bottom and a delivery chute and an opening in the bottom and means for driving successive charged interlocked portions of the belt through the said opening, means within the housing for disengaging successive portions of the interlocked edges of the belt, a roller beyond such disengaging means over and against which the belt is driven in an open condition, an inverted V-shaped saddle within the housing, the bottoms of the sides of said saddle being supported and sealed by the bottom of the housing, said saddle having an inverted V-shaped base in substantial contact with the bases of the successive portions of the belt entering the housing, the bottom of the said saddle and its supporting base being wider than the base of the said belt and the portion of the saddle facing the belt being sealed by the saddle, and means for effecting a seal around the portions of the belt entering the housing.

16. A conveying apparatus comprising, in combination, a continuous tubular conveyor comprising a substantially planar base and sides attached to said base, the outer edges of the sides being provided with interlocking means, means for driving the said belt with its base presented upwardly and with successive portions of the sides in open depending position, and means for supporting the said portions, the said means comprising a vertical support extending centrally upwardly between the depending sides, shafts journaled in the upper portion of the said support, and rollers on said shafts engaging the inner surface of the base adjacent to the depending sides.

17. In a conveying apparatus comprising a continuous movable tubular conveyor belt having a base and opposed sides and wherein the edges of the opposed sides are provided with interlocking means, a combined unloading carriage and hopper comprising a vertically extending housing having a bottom and a discharge chute, the said bottom being provided with an opening therein through which the conveyor belt passes and means within the said combined unloading carriage and hopper for separating the successive interlocked portions of the vertical stretch of the belt, and means for raising and lowering the hopper and carriage whereby the contents of the belt may be delivered at any desired point along its vertical stretch.

18. In a conveying apparatus comprising a continuous movable tubular conveyor belt having a base and opposed sides and wherein the edges of the opposed sides are provided with interlocking means, a combined unloading carriage and hopper having the belt passing therethrough and comprising a vertically extending housing having a bottom and a discharge chute, the said bottom being provided with an opening therein, roller means carried by said housing and bearing on side portions of said belt to retain same in engagement until moved beyond such means, means within the said combined unloading carriage and hopper and carried by said housing for separating the successive interlocked portions of the vertical stretch of the belt, and means for raising and lowering the hopper and carriage whereby the contents of the belt may be delivered at any desired point along its vertical stretch.

19. A conveying apparatus comprising, in combination, a continuous tubular conveyor comprising a substantially planar base and sides attached to said base, the outer edges of the sides being provided with interlocking means, means for driving the said belt with its base presented upwardly, said base of said belt extending laterally beyond said sides, means engaging the extended lateral portions of said base to retain the base in a given plane for movement therethrough, and roller means positioned to engage with the outer portions of the sides to positively disengage same while said belt is moved through a predetermined plane established by said second named means.

20. In a conveying apparatus comprising a continuous movable tubular conveyor belt having a base and opposed sides and wherein the edges of the opposed sides are provided with interlocking means, an unloading device comprising a housing having a bottom and a delivery chute and an opening in the bottom, means for driving successive charged interlocked portions of the belt through the said opening, means within the housing for disengaging successive portions of the interlocked edges of the belt, an inverted V-shaped saddle within the housing, the bottoms of the sides of said saddle being supported and sealed by the bottom of the housing, said saddle having a planar V-shaped base section in substantial contact with the bases of the successive portions of the belt entering the housing and being wider than the base of the said belt, and additional means for effecting a seal around the portions of the belt entering the housing.

21. In the conveying apparatus set forth in claim 20, means within the housing for disengaging the interlocked sides of the belt, and rollers positioned in the housing for retaining said sides in interlocked relation, said rollers being located ahead of said last named means.

22. In a conveying apparatus comprising a continuous movable tubular conveyor belt having a base and sides wherein the base extends beyond the sides thereby to provide supporting flanges for the said belt and wherein the outer edges of the sides are provided with interlocking means, an unloading device comprising a pair of opposed side members and means for driving successive charged interlocked portions of the said belt into and out of registration with said side members, rollers associated with said side members and engaging the external surface of the base of the belt for supporting same in a given plane, rollers intermediate and carried by said side members for engaging the outer edges of the sides of the belt to positively open same at desired location, and a roller beyond the last mentioned rollers over which the belt is driven in an open condition.

23. In a conveying apparatus comprising a continuous movable tubular conveyor belt having a base and opposed sides and wherein the edges of the opposed sides are provided with interlocking means, an unloading carriage device comprising a carriage, a pair of side members between which said belt passes, said carriage being movably positioned between said side members, means for driving successive charged interlocked portions of the belt between said side members, a roller supported by the side members and arranged above the said carriage and adapted to engage the external surface of the base of the belt, rollers carried by the said carriage and engaging the outer edges of the sides of said belt for retaining same in engagement, a roller located beyond the last mentioned rollers and over and against which the belt is conducted in open condition, and laterally spaced opening rollers supported by the said carriage between the last mentioned roller and the said rollers which engage the outer edges of the sides of the belt.

24. In a conveying apparatus comprising a continuous movable tubular conveyor belt having the edges of its opposed sides provided with interlocking means, an unloading device and means for moving successive charged interlocked portions of said belt into registration with the said device, and separators carried by the said device and adapted and arranged to engage the interiors of the sides of the belt, thereby to disengage the interlocked edges thereof, said separators comprising two roller members one of which is positioned on each side of the center line of the belt and is adapted to engage with only one side of the belt.

25. A conveyor system as in claim 24 wherein said rollers are carried by a common shaft extending transversely of said belt substantially parallel to the base thereof.

26. A conveyor system as in claim 24 wherein a saddle member is secured inside said device which is positioned for movement in a vertical plane, said saddle member being adjacent the base of the belt and having inclined side portions for guiding discharged material away from the base of the belt.

27. In a conveying apparatus comprising a continuous movable tubular conveyor belt having the edges of its opposed sides provided with interlocking means, an unloading device and means for moving successive charged interlocked portions of said belt into registration with the said device, guide means carried by the device for engaging with the belt and retaining it for movement in a given plane, separators carried by the said device and adapted and arranged to engage the interiors of the sides of the belt thereby to disengage the interlocked edges thereof, and a housing member associated with said unloading device and having said belt pass therethrough through openings provided therein, said housing member carrying means for engaging with the side edges of said belt to retain same in engagement, said last means being positioned forwardly of said separators.

28. In a conveying apparatus comprising a continuous movable tubular conveyor belt having the edges of its opposed sides provided with interlocking means, an unloading device and means for moving successive charged interlocked portions of said belt into registration with the said device, guide means carried by the device for engaging with the belt and retaining it for movement in a given plane, separators carried by the said device and adapted and arranged to engage the interiors of the sides of the belt thereby to disengage the interlocked edges thereof, and a housing member associated with said unloading device and having said belt pass therethrough through openings provided therein, said housing member having a discharge spout provided thereon for transmittal of discharged material therethrough.

HENRY S. JOHNS.
WILLIAM H. JOHNS.
ALFRED D. SINDEN.

REFERENCES CITED

The following references are of record in the file of this patent:

UNITED STATES PATENTS

| Number | Name | Date |
|---|---|---|
| 2,013,242 | Johns | Sept. 3, 1935 |
| 2,061,838 | Johns | Nov. 24, 1936 |
| 2,108,488 | Johns | Feb. 15, 1938 |
| 2,109,861 | Johns | Mar. 1, 1938 |
| 2,199,935 | Johns | May 7, 1940 |
| 2,342,039 | Davis | Feb. 15, 1944 |

FOREIGN PATENTS

| Number | Country | Date |
|---|---|---|
| 268,133 | Great Britain | Mar. 31, 1927 |
| 796,295 | France | Apr. 3, 1935 |